United States Patent
Chhatpar (10) Patent No.: US 10,027,754 B2
(45) Date of Patent: Jul. 17, 2018

(54) LARGE DATA SET UPDATING FOR NETWORK USAGE RECORDS

(71) Applicant: Verizon Patent and Licensing Inc., Arlington, VA (US)

(72) Inventor: Hema G. Chhatpar, Cumming, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 309 days.

(21) Appl. No.: 14/952,206

(22) Filed: Nov. 25, 2015

(65) Prior Publication Data

US 2017/0149892 A1  May 25, 2017

(51) Int. Cl.
| | | |
|---|---|---|
| G06F 15/16 | (2006.01) | |
| H04L 29/08 | (2006.01) | |
| H04L 12/863 | (2013.01) | |
| H04L 12/26 | (2006.01) | |

(52) U.S. Cl.
CPC .......... H04L 67/1097 (2013.01); H04L 43/00 (2013.01); H04L 47/625 (2013.01)

(58) Field of Classification Search
CPC .................................................... H04L 47/625
USPC ........................................................ 709/219
See application file for complete search history.

(56) References Cited

U.S. PATENT DOCUMENTS

| | | | | |
|---|---|---|---|---|
| 8,516,106 | B2 * | 8/2013 | Augenstein | G06F 11/324 709/224 |
| 2002/0141400 | A1 * | 10/2002 | Demartino | H04L 5/16 370/386 |
| 2007/0266059 | A1 * | 11/2007 | Kitamura | G06F 17/30997 |
| 2013/0332443 | A1 * | 12/2013 | Opalinski | G06F 17/30864 707/709 |
| 2015/0120741 | A1 * | 4/2015 | Abe | G06F 17/30076 707/740 |
| 2016/0100356 | A1 * | 4/2016 | Liu | H04W 48/18 370/329 |

OTHER PUBLICATIONS

Printout of the homepage of the Apache Software Foundation website (available at http://hadoop.apache.org, visited Nov. 25, 2015).

* cited by examiner

*Primary Examiner* — Hamza N Algibhah (57) ABSTRACT

Category labels, associated with IP addresses, may define a dominant usage role, in a network, of a corresponding IP address. Updates for a number of IP address/category label associations may be received, where the update may reflect changing roles relating to the IP addresses and/or to reflect newly used IP addresses. A merge operation may be performed to integrate the updated category labels into an existing data set that relates category labels to IP addresses. The merge operation may be performed within a distributed storage architecture that uses the write once read many (WORM) storage model.

20 Claims, 9 Drawing Sheets

Fig. 1

| Date |
|---|
| Acct_Num |
| MTN |
| Category_1_Bytes |
| Category_2_Bytes |

| IP_Address |
|---|
| Port |
| Category_Label |
| Timestamp |

LARGE DATA SET UPDATING FOR NETWORK USAGE RECORDS

BACKGROUND

The management of a telecommunications networks, such as cellular telecommunications networks, can require the processing of very large data sets. For example, the storage of traffic flow data records (FDRs), associated with customers of the telecommunications network, may require multiple petabytes of data. To economically store such a large data set, distributed storage and data processing techniques, designed for very large data sets that use commodity computing and storage clusters, may be used. The underlying storage architecture of some existing distributed storage and data processing techniques may be based on a write once read many (WORM) model.

It may be desirable to be able to efficiently process and update large data sets that are based on FDRs. For example, value added services and summary records may be provided to the telecommunications provider or to another entity. Updating the large data sets, however, on a per-record basis, may not be natively compatible with the WORM model.

BRIEF DESCRIPTION OF THE DRAWINGS

Embodiments of the present invention will be readily understood by the following detailed description in conjunction with the accompanying drawings. To facilitate this description, like reference numerals may designate like structural elements.

DETAILED DESCRIPTION OF PREFERRED EMBODIMENTS

The following detailed description refers to the accompanying drawings. The same reference numbers in different drawings may identify the same or similar elements.

Techniques described herein relate to the storage and processing of data sets in a distributed storage architecture that uses the WORM storage model. In some implementations, new data records may be received relating to a data set that was previously stored in a distributed storage system. The new data records may include records that are updated versions of records that had been previously stored. A merge operation is described herein to integrate the updated records into the existing data set.

In some implementations, the records in the data set may be derived from data feeds from a telecommunications network. Internet Protocol (IP) addresses may be associated with a category label that defines the primary function or dominant usage role of the IP address (e.g., video, audio, etc.). User traffic in the telecommunications network may be summarized, for each user, based on the amount of user traffic that was associated with the different category labels. For example, for a particular time period (e.g., over the previous week or month), the traffic usage for a particular user may tracked based on the amount of traffic used for audio traffic, the amount of traffic used for video traffic, etc.

In one implementation, the category labels, associated with the different IP addresses, may be updated to reflect changing roles relating to the IP addresses and/or to reflect newly used IP addresses. A merge operation may be performed to integrate the updated category labels into an existing data set that relates category labels to IP addresses. The merge operation may be performed within a distributed storage architecture that uses the WORM storage model.

Figure 1:
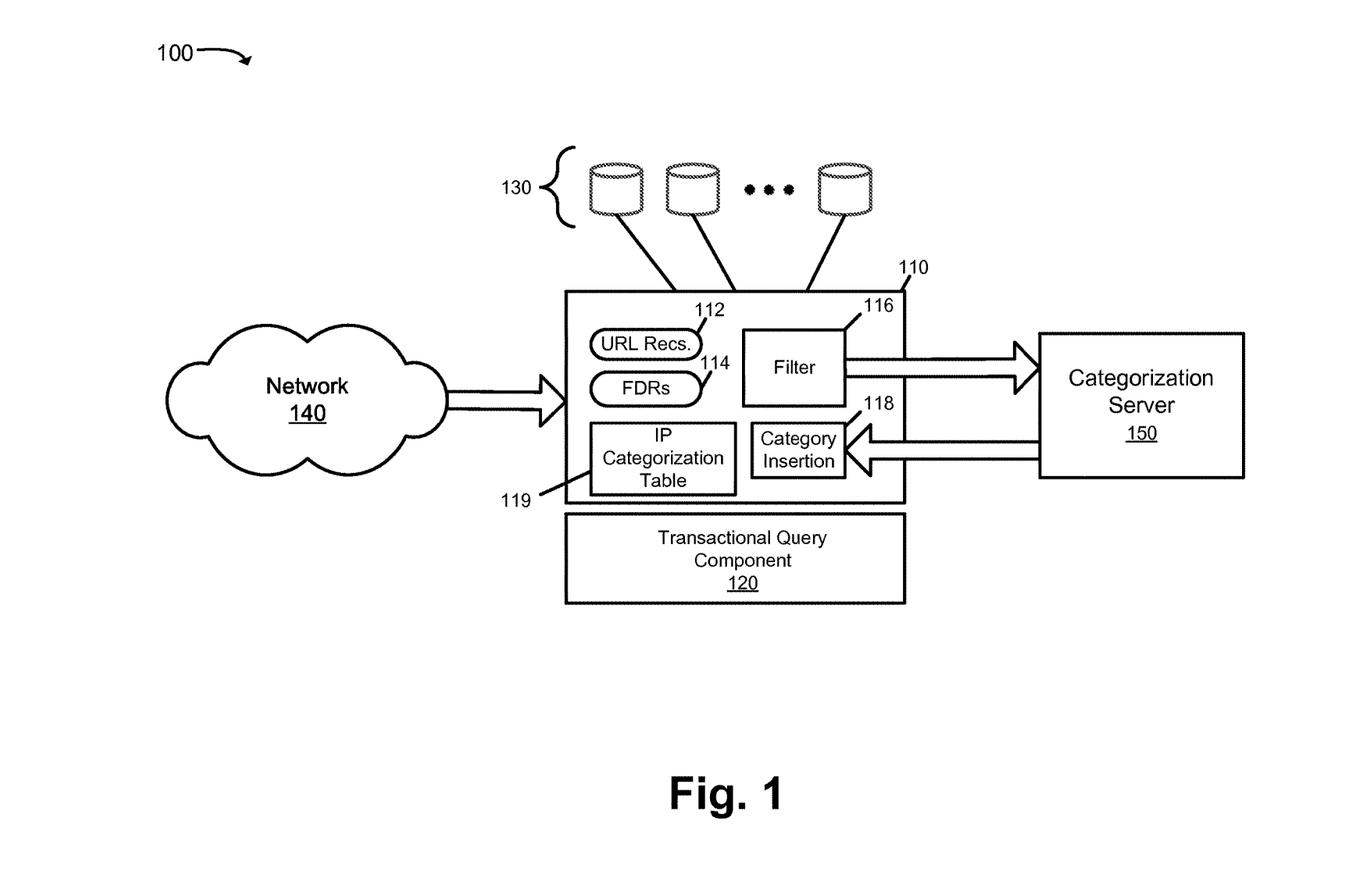
FIG. 1 is a diagram of an example environment in which techniques described herein may be implemented.

FIG. 1 is a diagram of an example environment 100 in which techniques described herein may be implemented. As shown, environment 100 may include a distributed storage and processing component 110 and a transactional query component 120. Distributive storage and processing component 110 that may store and process data sets, such as very large data sets (e.g., "big data" or "enterprise data" storage), using commodity storage devices 130. Distributed storage and processing component 110 may be designed based on the assumption that hardware failures, of commodity storage devices 130, are commonplace, and are automatically handled in software by distributed storage and processing component 110. As an example of the scale of a very large data set, a very large data set could mean multiple petabytes of data spread across hundreds or thousands of commodity storage devices 130. Distributive storage and processing component 110 may be implemented using, for example, the Hadoop open-source software framework, which is maintained by the Apache Software Foundation.

Commodity storage devices 130 may represent physical storage servers, nodes, or other storage devices. Commodity storage devices 130 may be geographically distributed and/or housed in a single data center. In general, commodity storage devices 130 may be implemented based on the use of many low-cost computing devices that perform storage and retrieval of data, as well as the performance of queries on the retrieved data.

Distributed storage and processing component 110 may store and process data, relating to network traffic, from a network. In FIG. 1, the raw data, input to distributed storage and processing component 110, may include network traffic statistics that are received from one or more telecommunications networks, illustrated as network 140 in FIG. 1. Network 140 may represent a number of types of networks, such as cellular communication networks, that may generate traffic information for storage by distributed storage and processing component 110. For example, the traffic information may include information relating to traffic from third generation (3G) or fourth generation (4G) cellular communications networks. More particularly, the information may include Uniform Resource Locators (URLs) that were visited by users of the cellular communication network and/or IP data pertaining to the users. The IP data may include, for example, IP addresses by the accessed by the users as well as the amount of data, potentially including both uplink and downlink data, communicated with the various IP addresses.

An IP address, such as an IP version 4 (IPv4) address, may be specified by an address value (e.g., a 20 byte value) and a port number (e.g., a two byte value). As used herein, the term "IP address" may refer to both the IP address/port combination, or, depending on the context, only the IP address value.

Distributed storage and processing component 110 may also receive data from additional sources, such as, as illustrated in FIG. 1, categorization server 150. Categorization server 150 may include one or more devices, such as a device operated by a third-party (i.e., a third-party relative to the operator of the cellular communications network and/or to the operator of distributed storage and processing component 110, and transactional query component 120). Categorization server 150 may include, for example, one or more computing devices to categorize IP addresses into a number of usage categories. The usage category, for a particular IP address, may relate to a particular function or dominant usage role of the IP address. For instance, an audio streaming service may stream audio from a particular IP address. This particular IP address may thus be associated with the category label "audio" or "streaming audio." Other possible category labels include "video," "email," "gaming," a label for a particular company or service, or other category labels.

As is further illustrated in FIG. 1, distributed storage and processing component 110 may include a number of logical components (e.g., data structures, software processes, etc.), illustrated as: URL records 112, FDRs 114, filter component 116, category insertion component 118, and IP categorization table 119. URL records 112 may include, for example, a record for each URL that is accessed by a user of network 140. FDRs 114 may include records relating to traffic or data flows in network 140. For example, FDRs 114 may include records of the IP addresses that are accessed by users, including the amount of uplink data transferred from the user to the IP address and/or downlink data transferred from the IP address and to the user.

Filter component 116 may represent one or more devices or processes that filter URL records 112 and FDRs 114 to remove customer sensitive data, before the data is transferred to an external service, such as categorization server 150. In one implementation, filter component 116 may be designed to remove any customer proprietary network information (CPNI) that is included in URL records 112 and FDRs 114.

Category insertion component 118 may receive categorized IP addresses from categorization server 150. For example, in one implementation, on a periodic basis (e.g., monthly or daily), distributed storage and processing component 110 may transmit a list of IP addresses (e.g., the top 500,000 most frequently accessed IP address/port combinations over a predetermined period) to categorization server 150. Categorization server 150 may return a category label (e.g., "audio," "video," etc.) associated with each of the IP addresses.

Distributed storage and processing component 110 may also maintain IP categorization table 119, such as by storing multiple copies of IP categorization table 119 on commodity storage devices 130. Although described as a "table," IP categorization table 119 could potentially be implemented as another type of data structure. IP categorization table 119 may store the associations between the returned category labels and the IP address/port combinations. Category insertion component 118 may update IP categorization table 119 with newly received associations.

Distributed storage and processing component 110 may operate to store tables as immutable data structures. An immutable data structure may be one that once written, cannot be changed except to delete the table. In other words, distributed storage and processing component 110 may use a WORM-based storage architecture. Consistent with aspects described herein, category insertion component 118 may logically update IP categorization table 119 despite the immutable nature of the data structure stored by distributed storage and processing component 110. The operation of category insertion component 118 will be described in more detail below with reference to FIGS. 4-6.

Transactional query component 120 may represent a database or other process or device that is designed to handle queries. Transactional query component 120 may be used to provide an interface for the data stored by distributed storage and processing component 110. In one implementation, category insertion component 118, or another process associated with distributed storage and processing component 110 or transactional query component 120, may process the tables stored by distributed storage and processing component 110 to obtain summary information that can be stored by transactional query component 120. For example, IP records 112, FDRs 114, and IP categorization table 119 may be processed to obtain summary information that includes a number of records, where each record may indicate, for a particular user account or mobile number, the amount of data used by the user, where the amount of data is organized by the category labels. For example, a record, for a particular user might indicate that, over the last month, the user used 1 GB (gigabyte) of video data, 500 MB (megabyte) of audio data, and 200 MB of email data.

Network 140 may represent a wireless network, such as a wireless cellular network. In one implementation, network 140 may include a wireless cellular network that is implemented based on the Long Term Evolution (LTE) standard. In other implementations, network 140 may include a wireless network implemented based on other standards, such as a Code Division Multiple Access (CDMA) 2000 1× network, a second generation (2G) wireless network, a third generation (3G) wireless network, a fifth generation (5G) wireless network, a "Wi-Fi" wireless network (e.g., a network that operates according to an Institute of Electrical and Electronics Engineers (IEEE) 802.11 standard), and/or another wireless network. In some implementations, network 140 may be communicatively coupled to one or more other networks.

Although FIG. 1 illustrates example components of environment 100, in other implementations, environment 100 may contain fewer components, different components, differently arranged components, or additional components than those depicted in FIG. 1. Alternatively, or additionally, one or more components of environment 100 may perform one or more other tasks described as being performed by one or more other components of environment 100.

FIGS. 2A-2D are diagrams illustrating example data structures 200, 210, 220, and 230, respectively, that may be received, such as network 140 or categorization server 150, or generated by distributed storage and processing component 110.

Figure 2A:
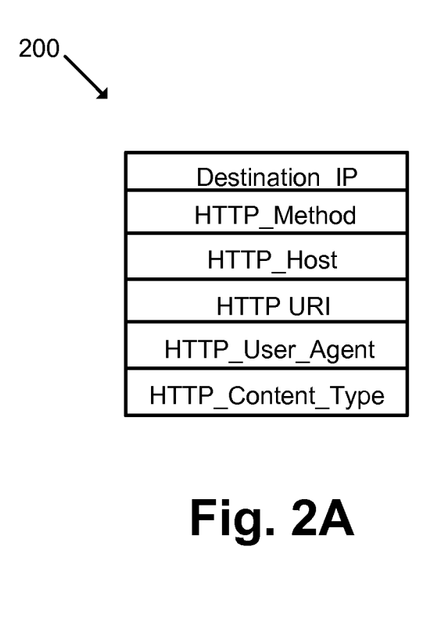
FIGS. 2A-2D are diagrams illustrating example data structures that may be received or generated by the distributed storage and processing component.

As shown in FIG. 2A, data structure 200 may be a URL data record, such as one corresponding to a record received as part of URL records 112. In one implementation, each hyper-text transfer protocol (HTTP) request (e.g., "web" request) from a user associated with network 140 may be received and stored, as a URL record in a format similar to that shown for data structure 200, by distributed storage and processing component 110. Data structure 200 may include fields for storing the IP address corresponding to the HTTP request (Destination_IP), the corresponding HTTP method (HTTP_Method) (e.g., GET or POST), the hostname for the HTTP connection (HTTP_Host), the HTTP URI (Uniform Resource Identifier) of the connection, the HTTP user agent string corresponding to the HTTP connection (HTTP_User-_Agent), and the HTTP content-type field corresponding to the HTTP connection (HTTP_Content_Type).

Figure 2B:
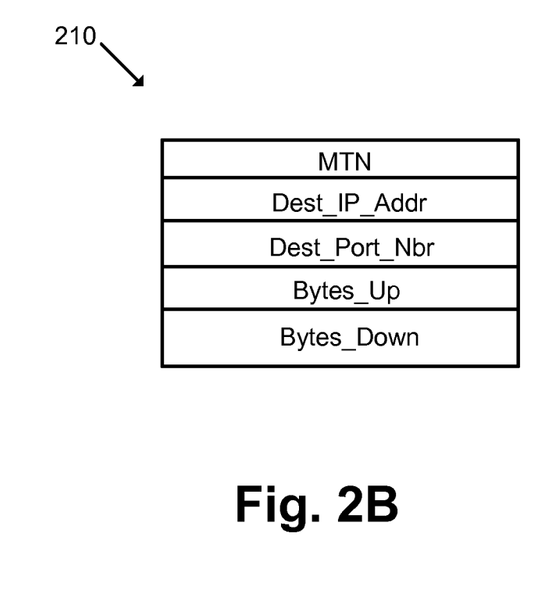

As shown in FIG. 2B, data structure 210 may correspond to an IP record associated with the traffic flow in network 140. In one implementation, each IP record received from network 140, such as data structure 210, may be stored by distributed storage and processing component 110. Data structure 210 may include fields for storing the mobile telephone number (MTN) of the mobile device that takes part in the traffic flow, the destination IP address (Dest_IP_Addr) and port number (Dest_Port_Nbr) associated with the traffic flow, and amount of uplink data (e.g., data originated by the mobile device and transmitted to the network) (Bytes_Up), and the amount of downlink data (e.g., data originated by a network host and received by the mobile device IP) (Bytes_Down).

Figure 2C:
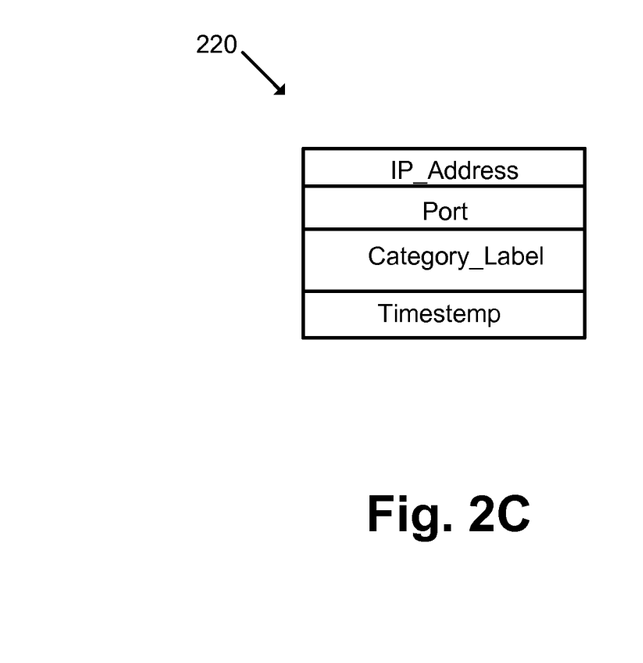

Based on the IP addresses in data structures 210, distributed storage and processing component 110 may occasionally generate a list of the most used IP addresses (e.g., the IP address and port combinations via which users of the cellular communications network communicate). For example, once a week (or once a day, etc.), distributed storage and processing component 110 may generate a list of the 500,000 most used IP/Port combinations and transmit the list to categorization server 150. Each entry in the list may include an indication of the total amount of traffic communicated with the IP/port combination (e.g., the total number of bytes communicated with the IP/port combination). Categorization server 150 may correspondingly return a list of records that includes, for each requested IP/port combination, a category label. Data structure 220, as illustrated in FIG. 2C, illustrates an example of a record returned from categorization server 150. Data structure 220 may include fields for storing the IP address and port value (IP_Address and Port) and a field for storing the category label associated with the IP address/port combination. In some implementations, IP categorization table 119 may additionally add a timestamp value (Timestamp) (e.g., the current date) to indicate the date/time at which the record was generated.

The newly received category labels, corresponding to data structures 220, from categorization server 150, may be merged with IP categorization table 119. The merge processes is described in more detail below with reference to FIGS. 4-6.

Figure 2D:
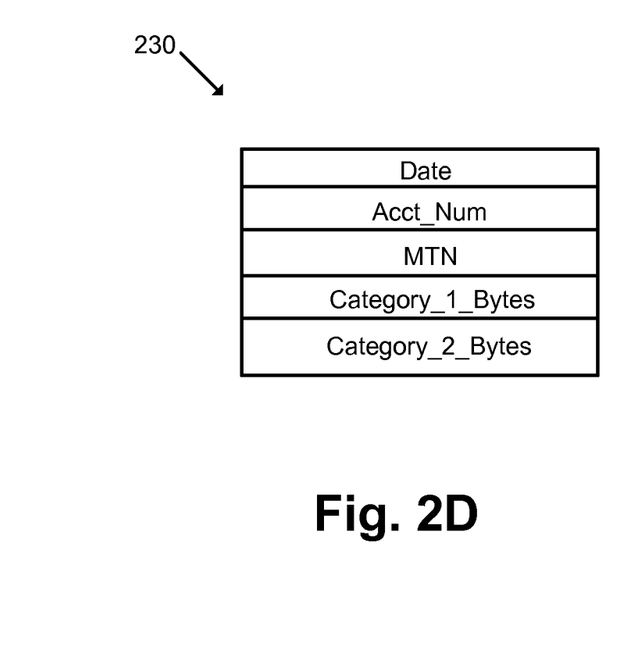

Distributed storage and processing component 110 may process IP categorization table 119 to obtain summary records, which may be provided to transactional query component 120 for use by other services associated with the provider of the cellular telecommunications network. An example of each of the summary records is shown in FIG. 2D as data structure 230. As shown, data structure 230 may include a date field (Date), which may be used to indicate the date at which data structure was created; a field that stores an account number (Acct_Num) of a user; and a field that stores the mobile telephone number (MTN) of the corresponding user. Data structure 230 may also include one or more fields that store the amount of traffic, used by the user (i.e., the user corresponding to the Acct_Num and MTN fields), for one or more category labels. As shown, two fields are illustrated that may each store the amount of data corresponding to a first category (Category_1_Bytes) and a second category (Category_2_Bytes). As an example, the first category may correspond to the category label of "audio" and the second category may correspond to the category label "video." In this situation, data structure 230 may correspond to a record that indicates the amount of audio and video data that was used by a particular user. In some implementations, data structure 320 may include a field for each possible category label (i.e., for the complete set of possible category labels). In these implementations, each user record, corresponding to data structure 230, may provide user data usage information for all of the possible category labels.

Figure 3:
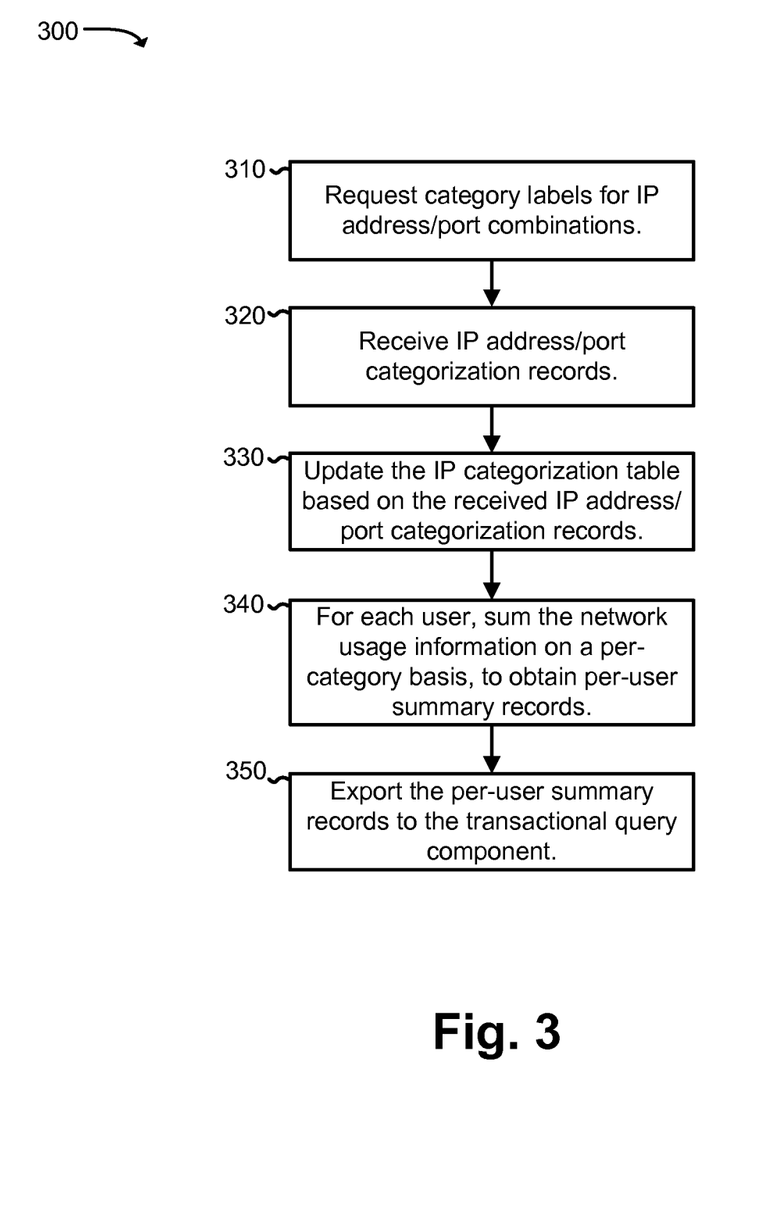
FIG. 3 is a flowchart illustrating an example process for updating data sets relating to network usage information.

FIG. 3 is a flowchart illustrating an example process 300 for updating data sets relating to network usage information. Process 300 may, in some implementations, be implemented by distributed storage and processing component 110.

Process 300 may include requesting category labels for different IP address and port combinations (block 310). As previously mentioned, URL data (e.g., including the destination IP addresses for user HTTP requests, as stored in data structure 200), and flow data (e.g., including the destination IP address and port numbers, and the amount of uplink and downlink data, as stored in data structure 210), may be received from network feeds, corresponding to network 240, and stored by distributed storage and processing component 110. Distributed storage and processing component 110 may periodically or occasionally (e.g., every week), analyze the URL data and/or the flow data to determine the most common IP/port combinations. In one implementation, the most common IP/port combinations may be the ones associated with the greatest total (e.g., network wide) amount of downlink data. For example, the top 500,000 (or some other number) of the most common IP/port combinations may be identified, and transmitted to categorization server 150 for categorization. Alternatively, the most common IP/port combinations may be the ones associated with the greatest number of requests (e.g., the greatest number of initiated network flows).

Process 300 may include receiving, from categorization server 150, the IP address/port categorization records (block 320). As previously mentioned, the categorizations may include category labels that define the primary function or dominant usage role of the IP address/port combination. Thus, each received record may include an indication of the IP address/port combination and an indication of the corresponding category label. Each received record may be structured similarly to data structure 220. Categorization server 150 may determine the category labels based on active or passive network analysis techniques and/or based on other techniques (e.g., manually classifying certain IP addresses as corresponding to certain businesses). From the point of view of distributed storage and processing component 110, the operation of categorization server 150 may be operated as a third-party service.

Process 300 may further include updating IP categorization table 119 based on the received IP address/port categorization records (block 330). In one implementation, updating IP categorization table 119 may include adding a modification time value, such as the current date/time, to each record returned from categorization server 150, such that the received IP address/port categorization records include, for each IP address/port combination: an IP address, a port value, a category label, and a timestamp value (e.g., the modification time value). IP categorization table 119 may then be updated so that each IP address/port combination that is not already in IP categorization table 119, from the received IP address/port categorization records, is added to IP categorization table 119. When the IP address/port combination is already in IP categorization table 119, the record may be updated when the category label is different than the category label that is currently stored in IP categorization table 119.

As previously mentioned, distributed storage and processing component 110 may operate to store tables as immutable data structures. Accordingly, updating IP categorization table 119, by overwriting changed records, may not be a practical option. In this situation, the updating of IP categorization table 119 is described in more detail below.

Process 300 may further include, for each user (e.g., for each MTN or user account number), summing the network usage information on a per-user and per-category basis (block 340). Summing the usage information may include parsing the flow data (e.g., data structures 210) to generate per-user summary records, such as the data structures 230.

Process 300 may further include exporting the per-user summary records to transactional query component 120 (block 350). The per-user summary records may then be queried, by other services or processes, associated with the cellular wireless network or the operator of the cellular wireless network.

Figure 4:
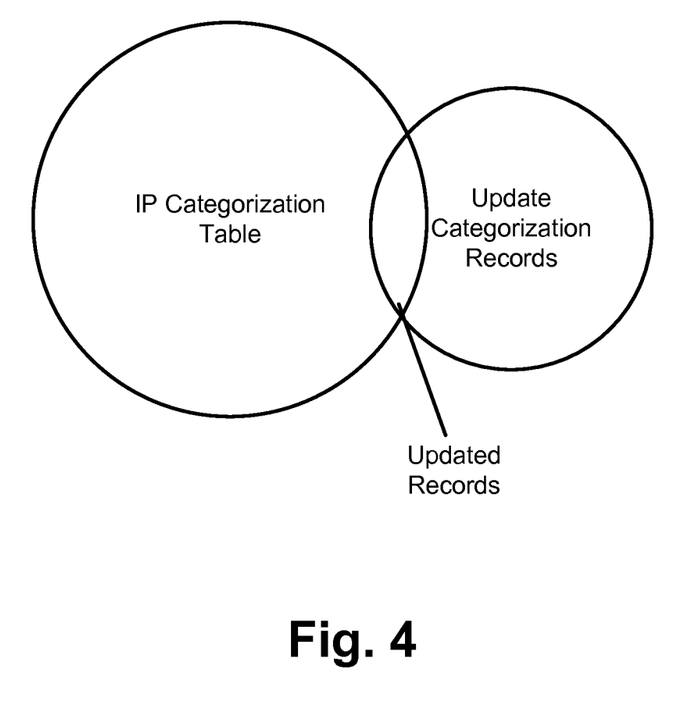
FIG. 4 is a diagram conceptually illustrating the updating of an IP categorization table.

FIG. 4 is a diagram conceptually illustrating the updating of IP categorization table 119, as performed in block 330 (FIG. 3). As illustrated, IP categorization table 119 (represented by the large circle on the left) may include a number of categorization records, similar to data structure 220 (i.e., a number of records that each include an IP address/port combination, category label, and timestamp value). Newly received IP address/port categorization records, as received from categorization server 150, and potentially modified to include timestamp values, are represented by the circle on the right (Update Categorization Records). The updated version of the IP categorization table should correspond to the union (merge) of the two circles. The intersection of the two circles, labeled as "Updated Records," represents IP address/port combinations that are in both IP categorization table 119 and in the newly received IP address/port categorization records. These records may be identified and only the most recent record included in the updated version of IP categorization table 119.

Figure 5:
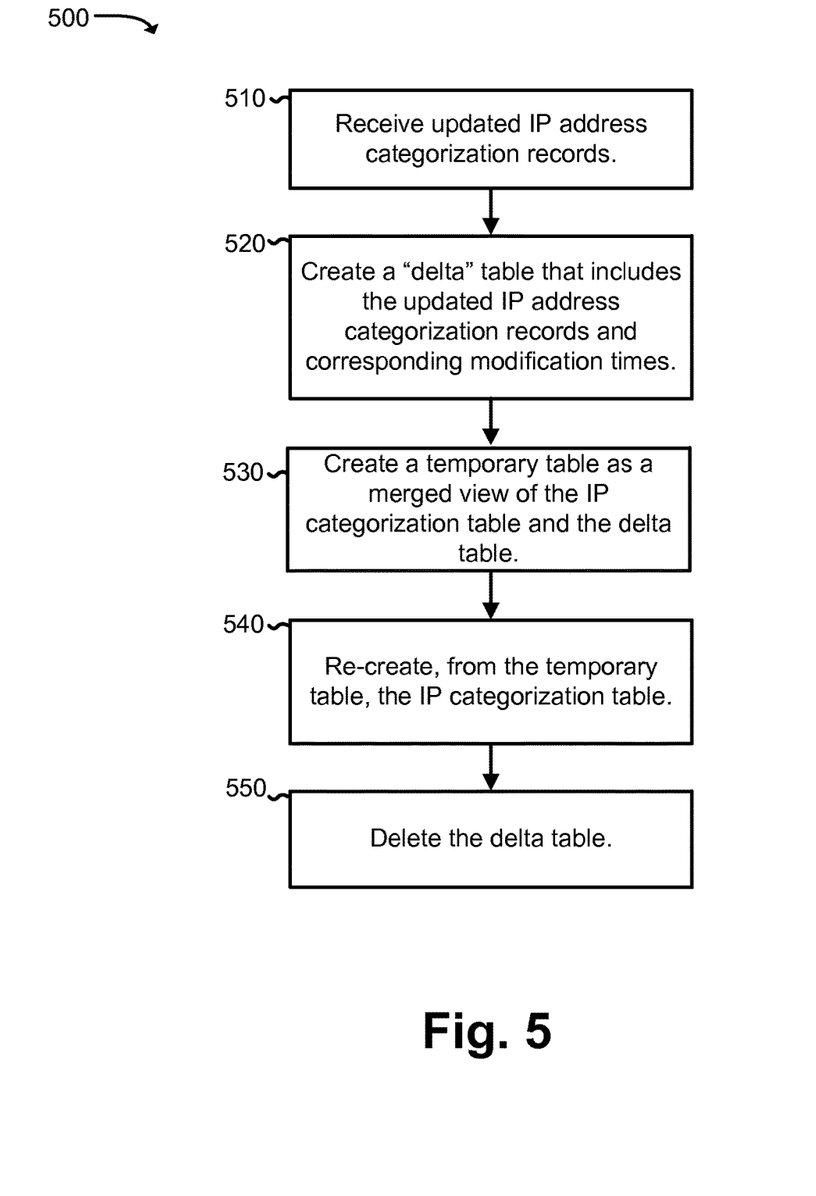
FIG. 5 is a flowchart illustrating an example process for updating the IP categorization table.

FIG. 5 is a flowchart illustrating an example process 500 for updating the IP categorization table. Process 500 may, in some implementations, be implemented by distributed storage and processing component 110, such as by category insertion component 118 of distributed storage and processing component 110.

Process 500 may include receiving the updated IP address categorization records (block 510). The updated IP categorization records may correspond to the records received from categorization server 150 (i.e., the records received in block 320 (FIG. 3)).

Process 500 may further include creating a table, referred to as a "delta" table herein, that includes the updated IP address categorization records and the corresponding modification times (block 520). The delta table may be generated from the IP address categorization records (received in block 510). In FIG. 5, the delta table corresponds to the circle "Update Categorization Records."

Process 500 may further include creating a temporary table, as a merged view of the IP categorization table and the delta table (block 530). The merged view may correspond to the union of the two circles shown in FIG. 5. That is, the merged view may include all the records from IP categorization table 119 and from the delta table, in which records having the same IP address/port combination (i.e., the "Updated Records" intersection shown in FIG. 5) may only be included once in the merged view, such that only the most recent version of the record is included in the merged view. The temporary table may be written, as an immutable data structure, to commodity storage devices 130.

Process 500 may further include re-creating, from the temporary table, the IP categorization table (block 540). In one implementation, re-creating IP categorization table 119 may include modifying links to the previous version of IP categorization table 119 to point to the temporary table. In other words, the previous version of IP categorization table 119 may be deleted and the temporary table renamed to take the place of the previous version of IP categorization table 119. Process 500 may further include deleting the delta table (block 550).

Figure 6:
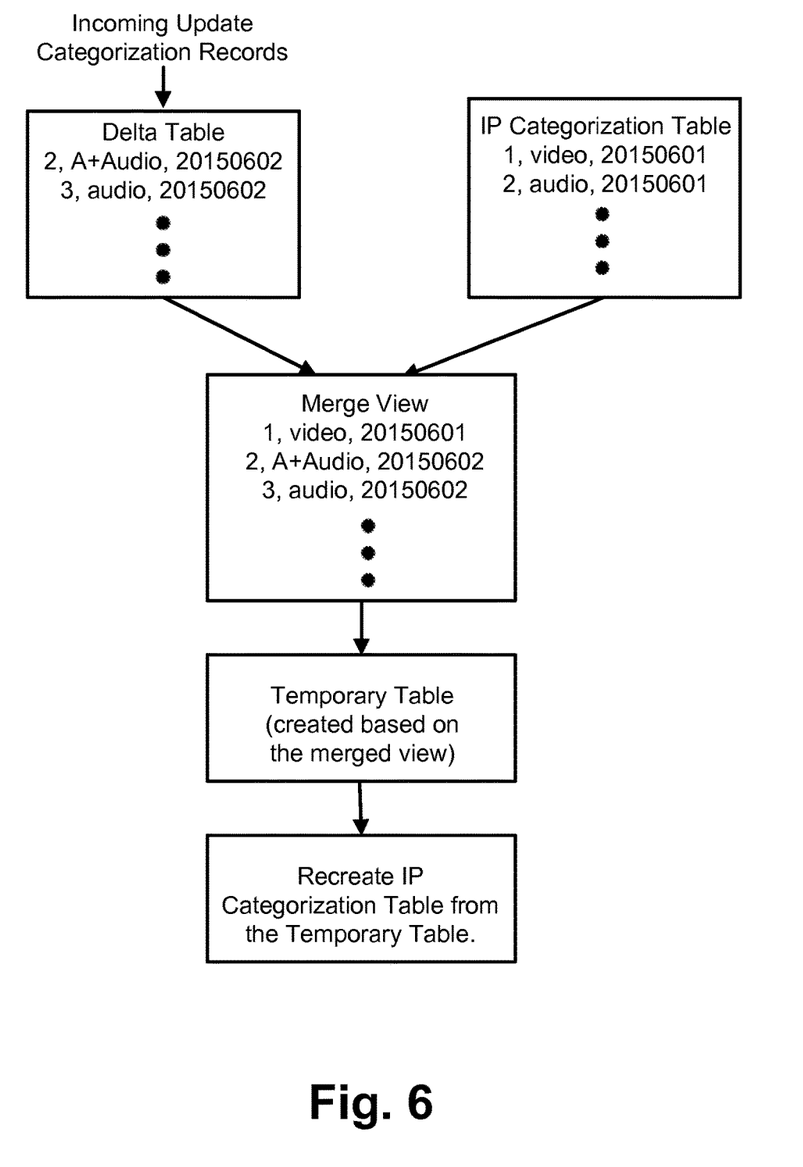
FIG. 6 is a diagram that graphically illustrates the updating of the IP categorization table.

FIG. 6 is a diagram that graphically illustrates the updating of IP categorization table 119, as performed in process 500. As shown, incoming update categorization records, such as records received from categorization server 150, may be written to the delta table. Two records are particularly shown, in FIG. 6, for the delta table: a first record corresponding to the IP address labeled as address "2," that corresponds to the category label "A+Audio," and that is associated with a timestamp of 20150602 (i.e., Jun. 2, 2015); and a second record corresponding to the IP address labeled as address "3," that corresponds to the category label "audio," and that is also associated with a timestamp of 20150602. In this example, assume that the category label "A+Audio" corresponds to a particular online streaming service, such as a company that offers streaming audio to users. The category label "A+Audio" may thus be a more specific categorization of the "audio" category label, which may correspond to general audio streaming.

The IP categorization table is illustrated in FIG. 6 as including particular two records: a first record corresponding to the IP address labeled as address "1," that corresponds to the category label "video," and that is associated with a timestamp of 20150601 (i.e., Jun. 1, 2015); and a second record corresponding to the IP address labeled as address "2," that corresponds to the category label "audio," and that is also associated with a timestamp of 20150601. The IP address "2," which is categorized as "audio" in the IP categorization table, is categorized as "A+Audio" in the delta table. This may thus correspond to the situation in which the category label, for the address "2", was updated by categorization server 150 to a more specific label.

Category insertion component 118 may merge the delta table and the IP categorization table to obtain a merged view of the tables. As shown, the merged view includes a merged version of the delta table and the IP categorization table. The three records, shown for the merged view, include the records for IP addresses "1" and "3", as well as the most recent record for IP address "2" (i.e., the version from the delta table).

Figure 7:
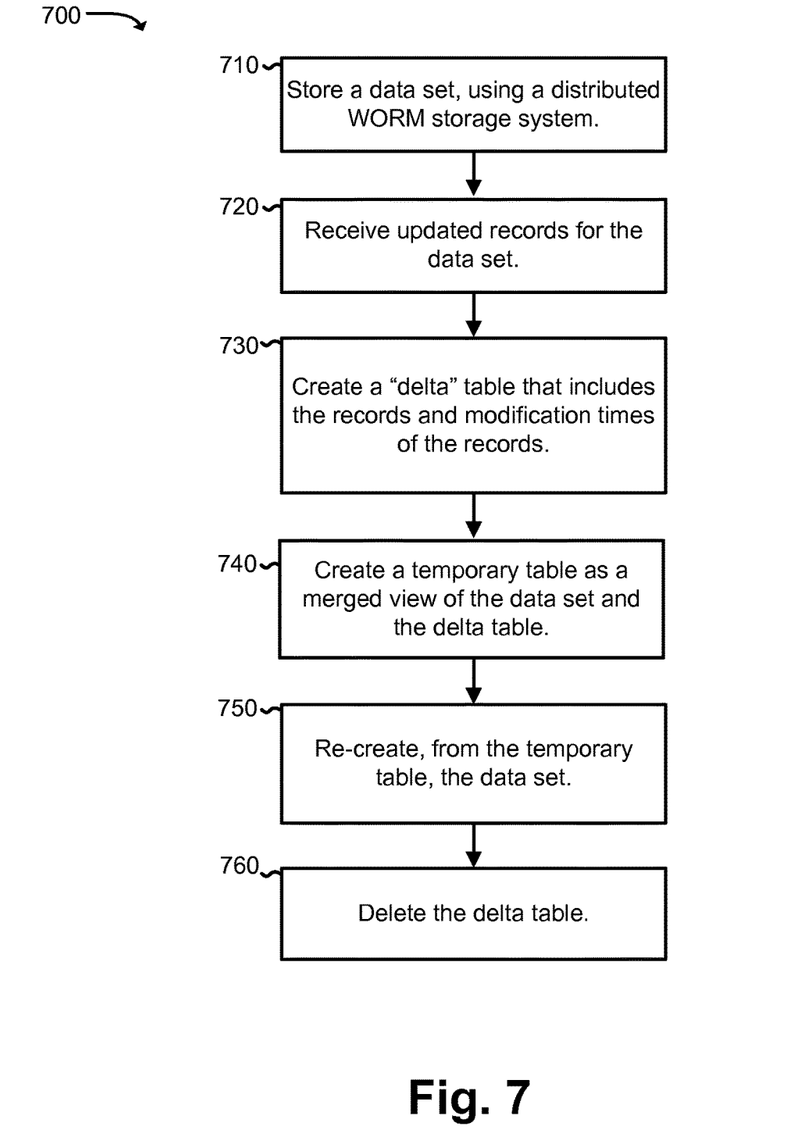
FIG. 7 is a flowchart illustrating an example process for updating a data set.

FIG. 7 is a flowchart illustrating an example process 700 for updating a data set. The data set may include a data set that includes a number of records and may be stored using a distributed storage system using a WORM model.

Process 700 may include storing the data set using a distributed WORM storage system (block 710). Block 710 may correspond to the initial storage of the data set. The data set may be stored, by distributed storage and processing component 110, to commodity storage devices 130.

Process 700 may include receiving updated records for the data set (block 720). The updated records may correspond to records received from an external device or service. At least some of the updated records may correspond to newer or more recent versions of records that were previously stored for the data set.

Process 700 may further include creating a table, referred to as a "delta" table herein, that includes the updated records and the corresponding modification times (block 730). The delta table may be generated from the updated records (received in block 720).

Process 700 may further include creating a temporary table, as a merged view of the data set and the delta table (block 740). The merged view may correspond to the union of the data set and the updated records. That is, the merged view may include all the records from the data set and from the delta table, in which duplicate records may only be included once in the merged view, such that only the most recent version of the record is included in the merged view. Two records may be determined to be "duplicate" records when one or more predefined fields, corresponding to the records, contain identical values. In other implementations, other definitions for when two records are "duplicates," may be used. The temporary table may be written, as an immutable data structure, to commodity storage devices 130.

Process 700 may further include re-creating, from the temporary table, the data set (block 750). In one implementation, re-creating the data set may include modifying links to the previous version of the data set to point to the temporary table. In other words, the previous version of the data set may be deleted and the temporary table renamed to take the place of the previous version of the data set. Process 700 may further include deleting the delta table (block 760).

Figure 8:
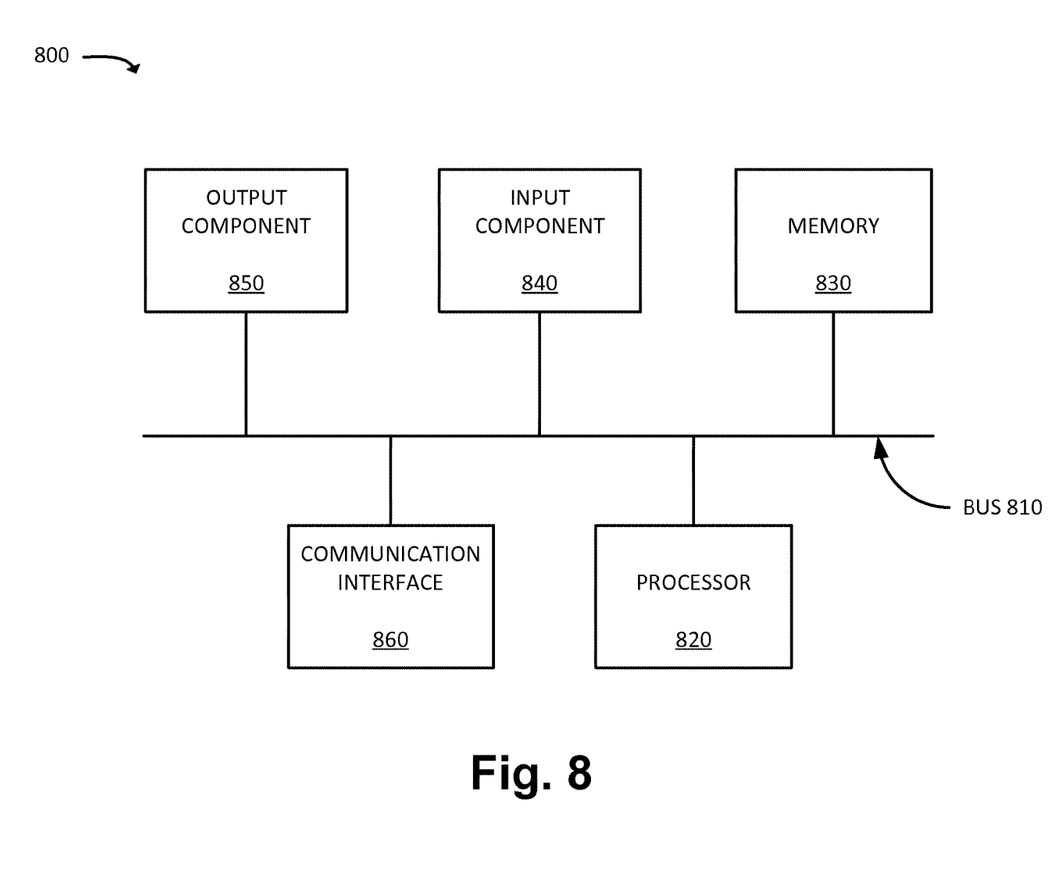
FIG. 8 is a diagram of example components of a device.

FIG. 8 is a diagram of example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include one or more processors, microprocessors, or circuitry that may include processing circuitry to interpret and execute instructions. Memory 830 may include any type of dynamic storage device that may store information and instructions for execution by processor 820, and/or any type of non-volatile storage device that may store information for use by processor 820. The operation of processor 820, in combination with memory 830, may be referred to as "processing logic" herein.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a Bluetooth radio, a cellular radio transceiver, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks have been described with regard to FIGS. 3, 5, and 7 the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A data storage and processing system comprising:
a plurality of distributed storage devices to store data for a write once read many (WORM) storage architecture, the stored data including an Internet Protocol (IP) address categorization table that stores associations between IP addresses and category labels, where each of the category labels defines a dominant usage role, in a wireless cellular network, of the associated IP address; and
processing logic to implement a merge operation, for the category labels, in the WORM storage architecture, by:
receiving updated category labels, for a plurality of corresponding IP addresses;
creating a second table, using the plurality of distributed storage devices, that stores the correspondences between the received updated category labels and the IP addresses;
creating a temporary table, using the plurality of distributed storage devices, the temporary table being created as a merged version of the IP address categorization table and the second table, the creation of the temporary table including writing the temporary table to the plurality of distributed storage devices; and
re-creating the IP address categorization table from the temporary table, the re-creating including:
controlling the plurality of distributed storage devices to delete the IP address categorization table, and
updating references to the deleted IP address categorization table to refer to the temporary table.

2. The data storage and processing system of claim 1, wherein the processing logic is further to:
transmit a request for the updated category labels, the request including the plurality of corresponding IP addresses, wherein the plurality of corresponding IP addresses are selected as a set of IP addresses that are most frequently accessed by users of the wireless cellular network.

3. The data storage and processing system of claim 2, wherein the set of IP addresses is selected as a threshold number of the most frequently accessed IP addresses, by the users of the wireless cellular network, over a particular time period.

4. The data storage and processing system of claim 1, wherein each of the IP addresses corresponds to an IP address and port combination.

5. The data storage and processing system of claim 1, wherein, when receiving the updated category labels, the processing logic is further to:
associate records corresponding to each of the received updated category labels with a current timestamp.

6. The data storage and processing system of claim 5, wherein the processing logic, when creating the temporary table as the merged version of the IP address categorization table and the second table, is further to:
resolve conflicts between records in the IP address categorization table and the second table based on using a record associated with a most recent timestamp value.

7. The data storage and processing system of claim 1, wherein the category labels include a label to indicate streaming audio and a label to indicate streaming video.

8. The data storage and processing system of claim 1, wherein the processing logic is further to:
obtain, based on the IP address categorization table, per-user summary records relating to an amount of traffic used by a user for two or more of the category labels.

9. A method, implemented using a storage architecture that includes a plurality of distributed storage devices to store data, the method comprising:
storing, using the plurality of distributed storage devices, a data set that includes a plurality of records, the data set being stored as a write once read many (WORM) data set that is physically distributed in the plurality of distributed storage devices;
receiving additional records corresponding to the data set, at least some of the additional records being records that correspond to updated versions of the plurality of records that were previously stored as part of the data set;
storing a first table, using the plurality of distributed storage devices, that includes the additional records;
storing a temporary table, using the plurality of distributed storage devices, that includes a merged version of the data set and the first table, the storing of the temporary table including writing the temporary table to the plurality of distributed storage devices; and
re-creating the data set from the temporary table, the re-creating including:
controlling the plurality of distributed storage devices to delete the data set, and
updating references to the deleted data set to refer to the temporary table.

10. The method of claim 9, further comprising:
deleting the first table after re-creating the data set.

11. The method of claim 9, wherein the data set is stored as an Internet Protocol (IP) address categorization table that stores associations between IP addresses and category labels, where each of the category labels defines a dominant usage role, in a wireless cellular network, of the associated IP address.

12. The method of claim 11, wherein the receiving the additional records further comprises:
receiving updated category labels for a plurality of corresponding IP addresses.

13. The method of claim 12, further comprising:
transmitting a request for the updated category labels, the request including the plurality of corresponding IP addresses, wherein the plurality of corresponding IP addresses are selected as a set of IP addresses that are most frequently accessed by users of the wireless cellular network.

14. The method of claim 11, wherein the IP addresses are selected as a threshold number of the most frequently accessed IP addresses, by the users of the wireless cellular network, over a particular time period.

15. The method of claim 9, wherein receiving the additional records comprises:
 associating the additional records with a current timestamp.

16. The method of claim 15, wherein, when storing the temporary table as the merged version of the data set and the first table, the method further includes:
 resolving conflicts between the data set and the first table based on using a record associated with a most recent timestamp value.

17. A system comprising:
 a non-transitory computer-readable medium containing program instructions; and
 one or more processors to execute the program instructions to:
  request category labels for Internet Protocol (IP) addresses, the request including a set of IP addresses that represents the most frequently accessed IP addresses, by users of a wireless cellular network, over a particular time period;
  receive, in response to the request, category labels for each of the IP addresses in the set of IP addresses, where each of the category labels defines a dominant usage role, in the wireless cellular network, of the corresponding IP address; and
  update, based on the received category labels, an Internet Protocol (IP) address categorization table, the updating of the IP categorization table including:
   creating a first table, using a plurality of distributed storage devices, that stores the correspondences between the received category labels and the IP addresses;
   creating a temporary table, using the plurality of distributed storage devices, the temporary table being created as a merged version of the IP address categorization table and the first table, the creation of the temporary table including writing the temporary table to the plurality of distributed storage devices; and
   re-creating the IP address categorization table from the temporary table, the re-creation including:
    controlling the plurality of distributed storage devices to delete the IP address categorization table, and
    updating references to the deleted IP address categorization table to refer to the temporary table;
  obtain, based on the IP address categorization table, per-user summary records relating to an amount of traffic used by a user for two or more of the category labels; and
  export the per-user summary records to a transactional query component.

18. The system of claim 17, wherein the category labels include a label to indicate streaming audio and a label to indicate streaming video.

19. The system of claim 17, wherein, when receiving the category labels, the processing logic is further to:
 associate records corresponding to each of the received category labels with a current timestamp.

20. The system of claim 17, wherein the set of IP addresses is selected as a threshold number of the most frequently accessed IP addresses, by the users of the wireless cellular network, over a particular time period.

* * * * *